United States Patent [19]

Alexander

[11] Patent Number: 5,383,192
[45] Date of Patent: Jan. 17, 1995

[54] MINIMIZING THE LIKELIHOOD OF SLIP BETWEEN THE INSTANT A CANDIDATE FOR A BREAK EVENT IS GENERATED AND THE INSTANT A MICROPROCESSOR IS INSTRUCTED TO PERFORM A BREAK, WITHOUT MISSING BREAKPOINTS

[75] Inventor: James W. Alexander, Hillsboro, Oreg.

[73] Assignee: Intel Corporation, Santa Clara, Calif.

[21] Appl. No.: 996,036

[22] Filed: Dec. 23, 1992

[51] Int. Cl.$^6$ .................................................. G06F 11/22
[52] U.S. Cl. ..................... 371/16.2; 395/500; 364/DIG. 1; 364/DIG. 2; 364/264.3; 364/266; 364/267; 364/267.7; 364/927.81; 364/943.9; 364/944.9
[58] Field of Search .................. 364/DIG. 1 MS File, 364/DIG. 2 MS File; 395/375, 500, 550, 575, 775, 800; 371/15.1, 16.1, 16.2, 22.4, 22.5, 22.6, 23

[56] References Cited

U.S. PATENT DOCUMENTS

| | | | |
|---|---|---|---|
| 4,847,805 | 7/1989 | Ishii et al. | 395/500 |
| 4,879,646 | 11/1989 | Iwasaki et al. | 371/16.5 |
| 4,933,941 | 6/1990 | Eckard et al. | 371/18 |
| 5,056,013 | 10/1991 | Yamamoto | 395/500 |

Primary Examiner—Robert B. Harrell
Attorney, Agent, or Firm—Owen L. Lamb

[57] ABSTRACT

An in-circuit emulator on an integrated circuit chip having an input pin for externally triggering on-chip break mechanisms. A break logic having an arm input is connected to an instruction pointer counter (IP counter). The break logic matches the IP counter to an instruction execution address. A counter is provided that once started runs a period of time and then shuts itself off, the length of the period of time being equal to the amount of time it takes for the break logic to arm after assertion of the arm input. A break logic control is connected to the input pin activates the arm input in response to signals on the input pin. The break logic control also starts the counter. The break logic control includes means connected to the arm input, to the counter, to the match output, and to the abrupt break input, operative upon the condition that the match output is asserted during the period of time, to inhibit the assertion of the arm input by the break logic control and asserts the abrupt break input to the abrupt break logic.

4 Claims, 2 Drawing Sheets

MINIMIZING THE LIKELIHOOD OF SLIP BETWEEN THE INSTANT A CANDIDATE FOR A BREAK EVENT IS GENERATED AND THE INSTANT A MICROPROCESSOR IS INSTRUCTED TO PERFORM A BREAK, WITHOUT MISSING BREAKPOINTS

CROSS-REFERENCE TO RELATED APPLICATION

Statutory Invention Registration H1291 published Feb. 1, 1994, application Ser. No. 630,499 entitled "A Microprocessor In Which Multiple Instructions Are Executed In One Clock Cycle By Providing Separate Machine Bus Access To A Register File For Different Types of Instructions" of Glen J. Hinton et al. filed Dec. 20, 1990; copending patent application Ser. No. 07/985,563 entitled "A Microprocessor Emulator Having Time-encoded Break Control Over Several Events" of James W. Alexander filed Dec. 3, 1992; copending patent application Ser. No. 07/999,387 Entitled "Apparatus For Transferring Information Between An Interrupt Producer And An Interrupt Service Environment" of James W. Alexander, et al. filed Dec. 31, 1992, all assigned to Intel Corporation, the assignee of the present invention.

BACKGROUND OF THE INVENTION

1. Field of the Invention

The present invention is related to data processing systems and more specifically to an in-circuit emulator which minimizes the likelihood of slip between the time a microprocessor generates a candidate for a break event and the time the microprocessor is instructed to perform the break, without missing breakpoints.

2. Prior Art

An in-circuit emulator (ICE) duplicates and imitates the behavior of a chip it emulates by using programming techniques and special machine features to permit the ICE to execute micro code written for the chip that it imitates. In the aboveidentified Hinton et al. statutory invention registration H1291, a microprocessor is disclosed in which several instructions may be executing at the same time in a pipelined manner. In this microprocessor the execution is so fast and so many instructions are executed in such a short period of time, that an emulator may be unable to stop on the instruction which generated an event that caused a break in the operation of the microprocessor under test. This situation is called slip. It means that one or more instructions are executed after the instruction which generated the event before emulation is terminated in response to a break. Slip allows more instructions to execute after an on-chip Instruction Pointer (IP) match is satisfied before a break is initiated. For the emulator function to perform satisfactorily, this slip condition must be minimized.

Copending patent application Ser. No. 07/985,563 provides an apparatus that will control a number of on-chip break mechanisms externally using only a single input pin. The emulator includes an instruction pointer counter (IP counter) and a break logic connected to the IP counter. The break logic has an arm input and is capable of matching the IP counter to an instruction execution address.

It is not feasible to place all of the logic analysis capability of a full featured emulator on the chip because of die area constraints. This invention allows the logic analyzer to be split into two segments: (1) a large complex segment with many levels of arm logic, disarm logic, counters, comparators, etc. located off the chip, and (2) a small, simple, fast segment with one layer of arm logic which resides on the chip. The two segments are connected serially, the off-chip segment preceding the on-chip segment. The invention minimizes the likelihood of slip to one region where the off-chip analyzer arms the on-chip analyzer, instead of creating a dead zone.

Once a cluster is armed, an instruction pointer (IP) match from the IP marchers that occurs after the cluster is armed results in a no-slip break, because as soon as the cluster fires in response to a break event, it having been previously armed, the emulation stops immediately. However, if an IP match happens between the time the break event occurs and the arm signal arms the cluster, a dead zone of many clocks occurs. In this situation it is possible for a break to be missed. The present invention changes the region of dead zone into a region of slip.

It is therefore an object of this invention to provide an in-circuit emulator in which the likelihood of slip between the time a candidate for a break event occurs and an arm signal arms the emulator to detect the break is minimized, without missing breakpoints.

SUMMARY OF THE INVENTION

Briefly, the above object is accomplished in accordance with the invention by providing an in-circuit emulator on an integrated circuit chip having an input pin;

an instruction pointer counter (IP counter);

a match logic connected to said IP counter;

said match logic including means for matching said IP counter to an instruction execution address and for asserting a match output upon the condition that said IP counter matches said instruction execution address;

a break logic;

said break logic having an arm input;

an abrupt break logic;

said abrupt break logic having an abrupt break input;

a counter that once started runs a period of time and then shuts itself off to delineate a fixed period of time at an output of said counter, said period of time being at least equal to the amount of time it takes for said break logic to arm after assertion of said arm input;

a break logic control connected to said input pin and to said arm input for activating said arm input in response to signals on said input pin;

first means connecting said match output to said counter for starting said counter;

abrupt break signature logic for generating an abrupt break signature;

arm signature logic for generating an arm signature; and, a mux connected to said abrupt break signature logic and said arm signature logic for selecting either said abrupt break signature or said arm signature in response to energization of a select input of said mux;

said select input of said mux being connected to said match.

The foregoing and other objects, features, and advantages of the invention will be apparent from the following more particular description of a preferred embodi-

Figure 1:
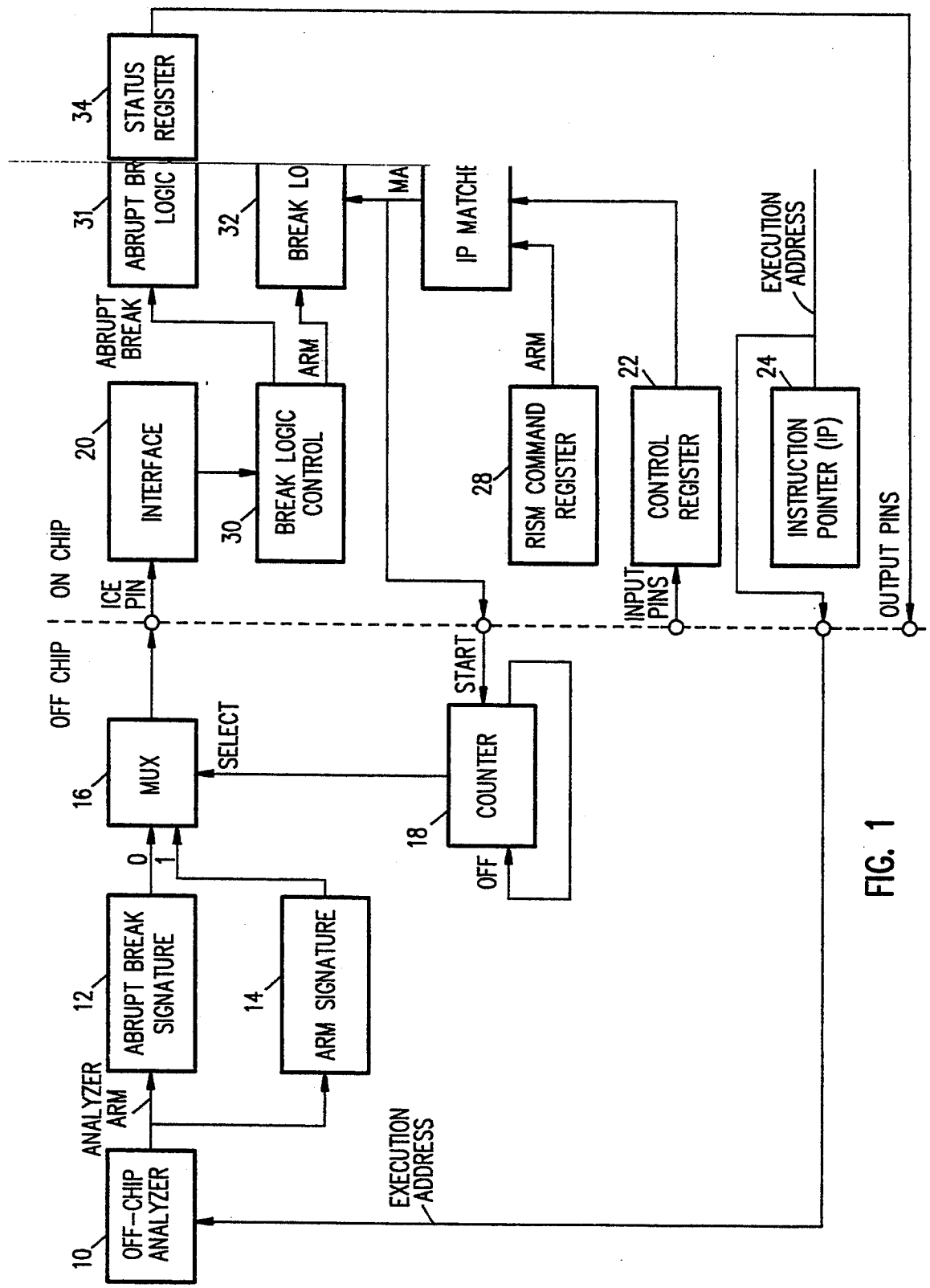
FIG. 1 is a functional block diagram of a microprocessor emulator in which the present invention is embodied; and, FIG. 2 is a flow chart of the operation of the logic of FIG. 1.

As described more fully in copending application Ser. No. 07/985,563, a useful emulation function is that of an abrupt break mechanism, which stops the execution of micro code for debugging purposes. In the past a single pin was used to trigger an abrupt break externally. It is desirable to be able to externally control abrupt and deferred arming and disarming of internal fast and permanent events, using the same input pin as was used in the past for just an abrupt break. There are not enough pins to be able to assign one pin for each of these emulator functions. Application Ser. No. 07/985,563 provides an in circuit emulator on an integrated circuit chip having an input pin for externally triggering on-chip break mechanisms. The emulator includes an instruction pointer counter (IP counter) and a first break logic connected to the IP counter. The fast break logic has a first arm input and is capable of matching the IP counter to a first instruction execution address. A second break logic is connected to the IP counter and has a second arm input. The second break logic is capable of matching the IP counter to a second instruction execution address and a third instruction execution address occurring a fixed time interval after the second instruction execution address in a multistage pipe line of instructions. A sequencer logic is connected to the input pin, the first arm input and the second arm input. The sequencer logic activates the second arm input after the input pin has been active for a first number of cycles and the sequencer logic activates the first arm input after the input pin has been active for a second number of cycles.

The external process sequencer includes a nonmaskable interrupt for the emulator (NMIE), a control register, a reduced instruction set monitor (RISM) command register, a fast and permanent break logic, and an abrupt break logic.

A break is the transition from an emulation mode to an interrogation mode. Breaking emulation involves recording the cause of the break in a status register and regaining control of the microprocessor. An off-chip logic analyzer generates NMIE breaks and operates in parallel with on-chip breaks. The sequencer can arm two clusters, cluster A and cluster B. When activated by the logic analyzer due to a match on an execution address, an NMIE break will lag the on-chip break by many clocks. A NMIE signal is interpreted as a GO during the interrogation state. The NMIE signal performs the function of invoking a break and activating the GO during interrogation.

Once a cluster is armed by the sequencer, an IP match from the IP matchers that occurs after the cluster is armed results in a no-slip break. because as soon as the cluster fires in response to a break event, it having been previously armed, the emulation stops immediately. Some IPs are used by the logic analyzer and some are used by the on-chip IP matchers. There is a lag from the time that an IP is generated until the time that the logic analyzer responds to it. Suppose that the response from the logic analyzer is to arm the IP matcher. Suppose also that a second IP which is the proper value to cause an on chip match appears during this lag time after the first IP has armed the on-chip matcher through the logic analyzer. In this situation, the break which should have been initiated by the second IP will be missed.

In order to resolve this situation and in accordance with the present invention, a counter is provided in the logic analyzer. Once started, the counter runs a period of time and then shuts itself off. The length of the count before the counter times out and resets itself is the amount of time it takes for the logic to arm a cluster. If an IP match occurs during the time the counter is running, the sequencer does not issue an arm signal to the break logic but instead immediately issues an abrupt permanent break to the abrupt break logic.

Refer to FIG. 1 which is a block diagram of a microprocessor emulator in which the present invention is embodied.

The off-chip logic is comprised of analyzer (10), abrapt signature break logic (12), a arm signature logic (14), a mux (16), and a counter (18). Analyzer (10) monitors each execution address in accordance with a test sequence and determines at what point in a sequence a break command is to be sent to the chip under test. At that point, the analyzer asserts an analyzer arm signal. The analyzer arm signal triggers abrupt signature break logic (12) and arm signature logic (14). The outputs of the abrupt signature break logic (12) and arm signature logic (14) enter a mux (16) which selects one of the signals to be sent to the ICE pin, depending upon the state of the select input to the MUX. The state of the select input is determined by whether the counter (18) is running or stopped.

The on-chip logic is comprised of an interface (20) which is connected to the ICE pin, a reduced instruction set monitor or RISM (28), which is described more fully in the above-identified patent application Ser. No. 07/999,387 fast and permanent break logic (30), abrupt break logic (31), IP matchers (26), control register (22) connected to input pins, instruction pointer (24), and status registers (34).

Once break logic (32) is armed by the off-chip analyzer (10), an IP match from the IP marchers (26) that occurs after the break logic is armed results in a no-slip break, because as soon as the break logic fires in response to a break event, it having been previously armed, the emulation stops immediately. However, if an IP match happens between the time the break event occurs and the arm signal arms the cluster, a dead zone of many clocks occurs. In this situation it is possible for a break to be missed.

The counter (18) is provided in order to resolve this situation,. Once started, the counter runs a period of time and then shuts itself off. The length of the count before the counter times out and resets itself is the amount of time it takes for the instruction pointer (24) to initiate the arming of the break logic (32) through the off-chip analyzer (10). If the counter is not running, then the arm signature (14) is allowed to pass through the MUX (16) to arm the break logic (32). An IP match that occurs subsequent to this will cause a break.

If an IP match occurs during the time the counter (18) is running, then the arm signature (14) is not allowed to pass through the MUX (16) to arm the break logic (32). Instead the abrupt break signature (12) is allowed to pass through the MUX (16) which immediately causes an abrupt break to the abrupt break logic (31).

Figure 2:
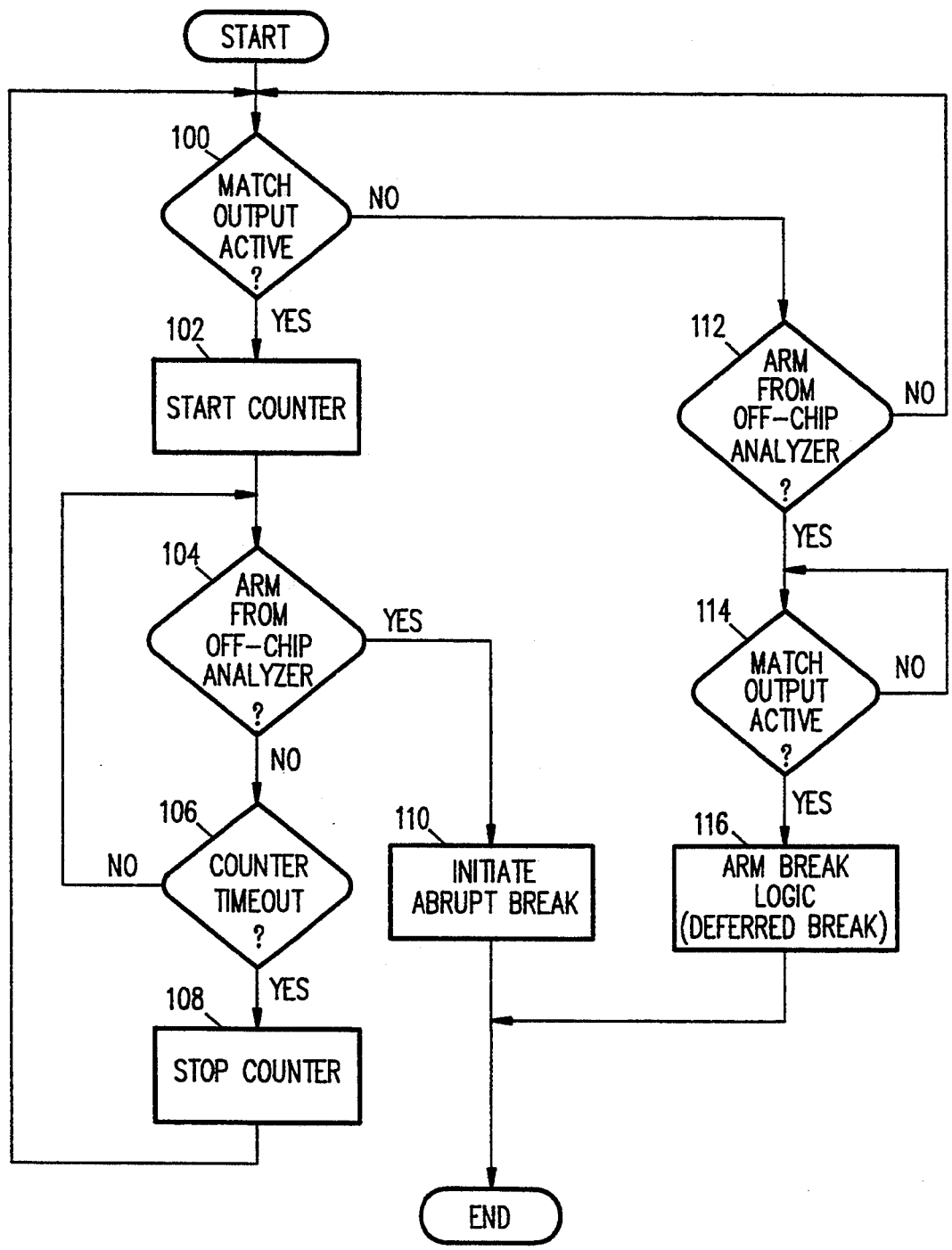

Refer now to FIG. 2 which is a flow chart which illustrates the operation of the logic in FIG. 1. If the match output is active at the decision block (100), the break control logic starts the counter (102). An arm signal from the off-chip analyzer (104) will initiate an abrupt break (110). If no arm signal occurs before the counter times out, the counter will stop itself (108). If a counter time-out occurs at decision block (104), the counter is stopped (108) and the logic will wait for a break request from the off-chip logic analyzer. When a break request occurs at block (112), the logic waits (114) for a match from the IP matchers. When a match occurs a break is signaled (116).

While the invention has been particularly shown and described with reference to preferred embodiments thereof, it will be understood by those skilled in the art that the foregoing and other changes in form and detail may be made therein without departing from the scope of the invention.

What is claimed is:

1. In an in-circuit emulator on an integrated circuit chip having
   an input pin;
   an instruction pointer counter;
   a break logic; and,
   an abrupt break logic;
   an improvement comprising:
   first means for registering an instruction execution address;
   second means connected to said instruction pointer counter and to said first means for asserting a match output upon a condition that a contents of said instruction pointer counter matches said instruction execution address:
   third means connected to said second means for clocking a period of time, said period of time being an amount of time said break logic takes to arm in response to assertion of an arm signal;
   fourth means connected to said second means and to said third means for generating an abrupt break signal at said input pin upon a condition that said match output is asserted during said period of time;
   fifth means connected to said third means for generating an arm signal at said input pin upon a condition that said match output is not asserted during said period of time;
   sixth means connected to said input pin for activating said break logic in response to said arm signal on said input pin; and,
   seventh means connected to said input pin for activating said abrupt break logic in response to said abrupt break signal on said input pin.

2. In an in-circuit emulator on an integrated circuit chip having
   an input pin;
   an instruction pointer counter;
   a register for registering an instruction address;
   a match logic connected to said instruction pointer counter and to said register;
   said match logic asserting a match output upon a condition that a contents of said instruction pointer counter matches a contents of said register;
   a break logic;
   said break logic having an arm input; and,
   an abrupt break logic;
   said abrupt break logic having an abrupt break input;
   an improvement comprising:
   first means for delineating a fixed period of time at an output of said first means, said period of time being at least equal to an amount of time said break logic takes to arm after assertion of said arm input;
   second means connected to said input pin and to said arm input for activating said arm input in response to signals on said input pin;
   third means connecting said second means to said first means for starting said first means;
   fourth means for generating an abrupt break signal;
   fifth means for generating an arm signal;
   sixth means connected to said fourth and fifth means for selecting either said abrupt break signal or said arm signal in response to energization of a select input of said sixth means; and,
   seventh means for connecting said output of said first means to said input of said sixth means.

3. In an in-circuit emulator comprising:
   an input pin;
   an instruction pointer counter;
   a match logic connected to said instruction pointer counter;
   said match logic matching said instruction pointer counter to an instruction execution address and for asserting a match output upon the condition that said instruction pointer counter matches said instruction execution address;
   a break logic;
   said break logic having an arm input; and,
   an abrupt break logic;
   said abrupt break logic having an abrupt break input;
   an improvement comprising;
   a counter that delineates a fixed period of time at an output of said counter, said period of time being at least equal to an amount of time said break logic takes to arm after assertion of said arm input;
   a break logic control connected to said input pin and to said arm input for activating said arm input in response to signals on said input pin;
   first means connecting said match output to said counter for starting said counter;
   abrupt break signature logic for generating an abrupt break signal;
   arm signature logic for generating an arm signal; and,
   a MUX connected to said abrupt break signature logic and to said arm signature logic for selecting either said abrupt break signal or said arm signal in response to energization of a select input of said MUX;
   said select input of said MUX being connected to said output of said counter.

4. In an in-circuit emulator on an integrated circuit chip having
   an input pin;
   an instruction pointer counter (IP counter);
   a break logic;
   an abrupt break logic;
   a method comprising steps of:
   A. comparing said instruction pointer counter to an instruction execution address;
   B. asserting a match output upon a condition that said instruction pointer counter matches said instruction execution address;
   C. starting a counter that once started runs a period of time and then is shut off, said period of time being an amount of time said break logic takes to arm in response to an arm signal;

D. generating said abrupt break signal at said input pin upon a condition that said match output is asserted during said period of time;

E. generating an arm signal at said input pin upon a condition that said match output is not asserted during said period of time;

F. activating said break logic in response to said arm signal on said input pin; and, G. activating said abrupt break logic in response to said abrupt break signal on said input pin.

* * * * *

UNITED STATES PATENT AND TRADEMARK OFFICE
CERTIFICATE OF CORRECTION

PATENT NO. : 5,383,192

DATED : January 17, 1995

INVENTOR(S) : James W. Alexander

It is certified that error appears in the above-identified patent and that said Letters Patent are hereby corrected as shown below:

Column 1, line 41, change "aboveidentified" to -- above-identified --
Column 2, line 12, change "marchers" to -- matchers --
Column 4, line 19, change "abrapt" to -- abrupt --
Column 4, line 43, change "marchers" to -- matchers --
Column 5, line 35, change ":" to -- ; --

Signed and Sealed this

Ninth Day of April, 1996

Attest:

BRUCE LEHMAN

*Attesting Officer*       *Commissioner of Patents and Trademarks*